United States Patent [19]

Jolin

[11] 4,323,377
[45] Apr. 6, 1982

[54] MOBILE DUST COLLECTOR

[75] Inventor: Marcel Jolin, Dollard des Ormeaux, Canada

[73] Assignee: Dustell LTEE, Lachine, Canada

[21] Appl. No.: 203,706

[22] Filed: Nov. 3, 1980

[51] Int. Cl.³ .................. B02C 23/10; B01D 46/02
[52] U.S. Cl. ...................... 55/341 HM; 55/356; 55/358; 55/385 D; 55/422; 55/432; 55/472; 55/418; 15/352; 241/79.1
[58] Field of Search .......... 55/334, 335, 341 R, 55/341 HMB, 356, 358, 385 B, 385 D, 422, 432, 472, 493, DIG. 3, 418; 15/340, 347, 348, 352; 241/79.1

[56] References Cited

U.S. PATENT DOCUMENTS

| | | | |
|---|---|---|---|
| 984,810 | 2/1911 | Green | 55/334 |
| 2,622,341 | 12/1952 | Finnegan | 55/432 |
| 2,703,733 | 3/1955 | Stueven | 55/422 |
| 3,480,330 | 11/1969 | Hirs et al. | 55/432 |
| 3,535,851 | 10/1970 | Riemsloh | 55/341 HMB |
| 3,842,461 | 10/1974 | Wurster | 15/340 |
| 3,870,489 | 3/1975 | Shaddock | 15/340 |
| 3,930,817 | 1/1976 | Stevenson et al. | 55/302 |
| 4,017,281 | 4/1977 | Johnstone | 55/334 |
| 4,121,915 | 10/1978 | Anderson | 55/356 |
| 4,193,159 | 3/1980 | Beard | 15/352 |
| 4,204,846 | 5/1980 | Brenholt | 55/493 |

FOREIGN PATENT DOCUMENTS 627841 10/1978 U.S.S.R. ............. 55/341 R

Primary Examiner—David L. Lacey
Attorney, Agent, or Firm—Fishman and Van Kirk

[57] ABSTRACT

The disclosure teaches a mobile dust collector which comprises a housing structure mounted on a trailer. The housing structure includes a filter chamber and a fan chamber. An opening in the side wall of the filter chamber communicates outside air with the filter chamber, and a plurality of filter bags disposed in the filter chamber make up the filter of the dust collector. A fan is disposed in the fan chamber, and the interior of the filter chamber is communicated with the fan. Wheels at the back of the trailer are adapted to rollingly support the trailer, and a removable support is disposed at the front end of the trailer for supporting the trailer when it is in a stationary condition. In operation, the housing structure stands in an upright position. Means are included for self erection of the housing structure.

20 Claims, 5 Drawing Figures

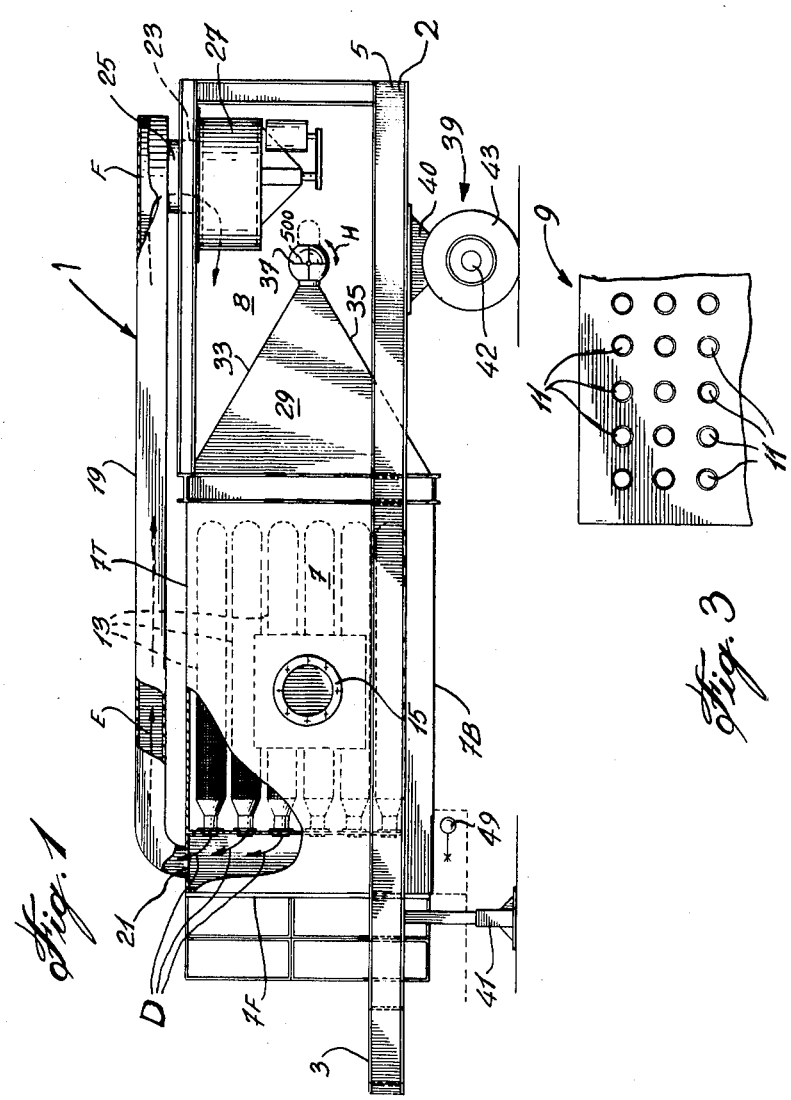

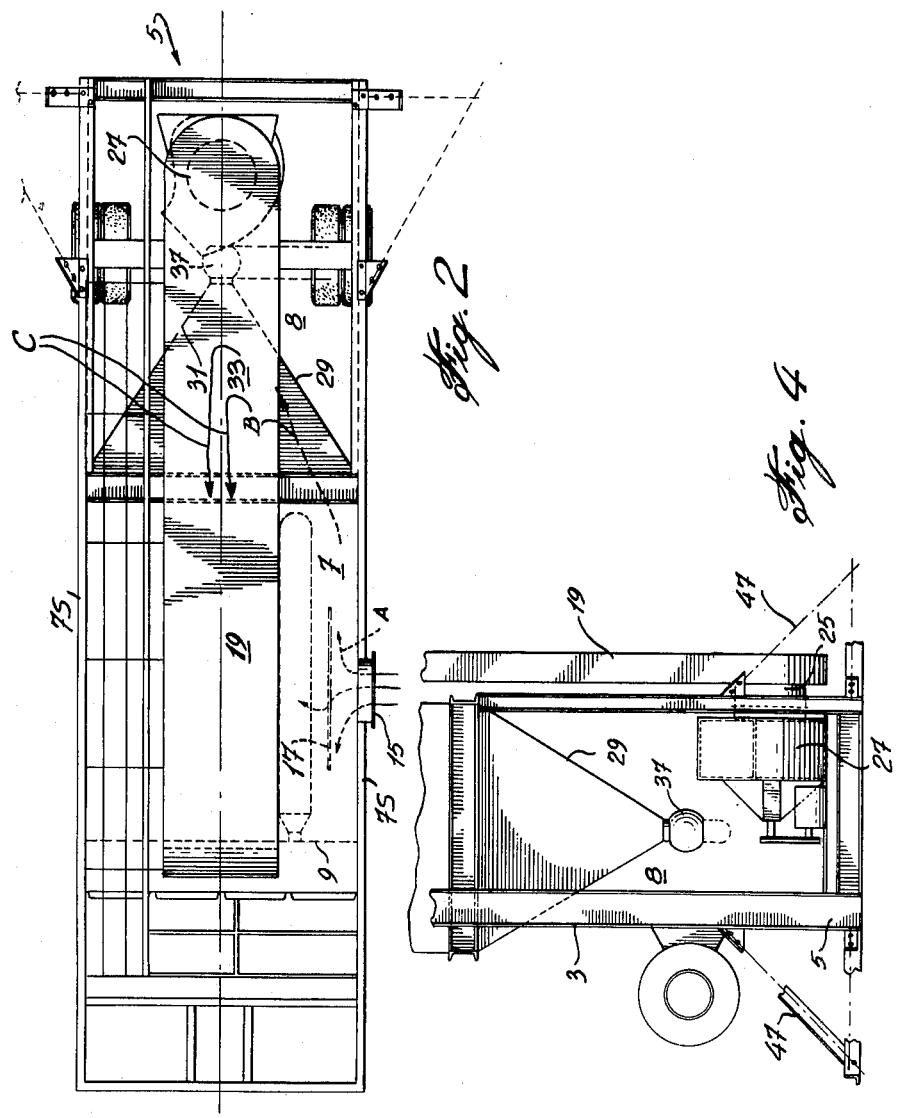

MOBILE DUST COLLECTOR

BACKGROUND OF THE INVENTION (a) Field of the Invention

The invention relates to a mobile heavy duty dust collector.

(b) Description of Prior Art

Vibrating screens at quarries blow up a good deal of dust during their operation so that the air around the quarry is filled with dust. For reasons of health and to avoid pollution, the dust filled air must be collected and filtered to cleanse it. Presently available dust collectors for vibrating screens at quarry sites are fixed-in-place arrangements. Such arrangements suffer from the disadvantage of requiring the time for their construction, and in not being movable once they are built.

It will, of course, be appreciated a dust collection at quarry sites must be performed by heavy duty dust collectors especially at the vibrating screens. The prior art does not teach any such collectors suitable for this task. That is, the prior art does not teach a heavy duty dust collector which is mobile and which is suitable for use at a quarry site. Thus, U.S. Pat. No. 3,870,489, Shaddock, Mar. 11, 1975; 3,842,461, Wurster, Oct. 22, 1974 and 3,930,817, Stevenson et al, Jan. 6, 1976, are examples of heavy duty vacuum, or extraction, apparatus or air filter systems which are mobile. As will be seen, the systems taught in the prior art are in no way similar to the system as taught in the present application.

SUMMARY OF THE INVENTION

It is therefore an object of the invention to provide a mobile dust collector useful at quarry sites.

In accordance with the invention there is provided a mobile dust collector comprising: trailer means having; a housing structure mounted on said trailer means, said housing structure including: (i) a filter chamber and a fan chamber; (ii) means communicating outside air with said filter chamber; (iii) filter means disposed in said filter chamber; (iv) fan means disposed in said fan chamber; and (v) means communicating the interior of said filter chamber with said fan means; and means for swivelling the housing structure into an upright position, said means comprising: a first telescoping member connected on one side of said housing structure; a second telescoping member connected on the other side of said housing structure; a first vertically extending frame member on one side of said housing structure; a second vertically extending frame member on the other side of said housing structure; a first horizontally extending frame member on one side of said trailer means; a second horizontally extending frame member on the other side of said trailer means; said housing structure being pivotally connected, at either side thereof, to said vertically extending frame members; the top of each telescoping member being connected to said housing structure at respective sides thereof; and the bottom of each telescoping member being connected to a respective one of said horizontally extending frame members; and wheel means at the back end of said trailer means to rollingly support said trailer means.

In accordance with a more specific embodiment of the invention there is provided a mobile dust collector comprising: trailer means; a housing structure mounted on said trailer means, said housing structure including: a filter chamber at the front end thereof, said filter chamber defined by a front end wall, two opposing side walls, a top wall and a bottom wall; plate means transversing said filter chamber and spaced rearwardly from said front end wall, said plate means comprising a plurality of openings; a separate filter bag at each of said openings, each of said filter bags extending from said plate means and rearwardly into said filter chamber; a side opening in one of said side walls of said filter chamber between said first end wall and said plate means; a first top opening in said top wall of said filter chamber; a fan chamber at the back end thereof and having a fan means disposed in said fan chamber, said fan chamber being defined by at least a fan chamber top wall; a second top opening in said fan chamber top wall; duct means connected, at one end thereof, to said first top opening and, at the other end thereof, to said second top opening, whereby said fan means is in communication with the interior of said filter chamber; and means for swivelling the housing structure into an upright position, said means comprising: a first telescoping member connected on one side of said housing structure; a second telescoping member connected on the other side of said housing structure; a first vertically extending frame member on one side of said housing structure; a second vertically extending frame member on the other side of said housing structure; a first horizontally extending frame member on one side of said trailer means; a second horizontally extending frame member on the other side of said trailer means; said housing structure being pivotally connected, at either side thereof, to said vertically extending frame members; the top of each telescoping member being connected to said housing structure at respective sides thereof; and the bottom of each telescoping member being connected to a respective one of said horizontally extending frame members; and wheel means at the back end of said trailer means to rollingly support said trailer means.

BRIEF DESCRIPTION OF THE DRAWINGS

The invention will be better understood by an examination of the following description together with the accompanying drawings in which:

FIG. 1 is a side view of the dust collector in accordance with the invention;

FIG. 2 is a top view of the dust collector;

FIG. 3 illustrates the plate in the filter chamber;

FIG. 4 is a side view of the dust chamber in its operating position; and

DESCRIPTION OF PREFERRED EMBODIMENTS

Figure 5:
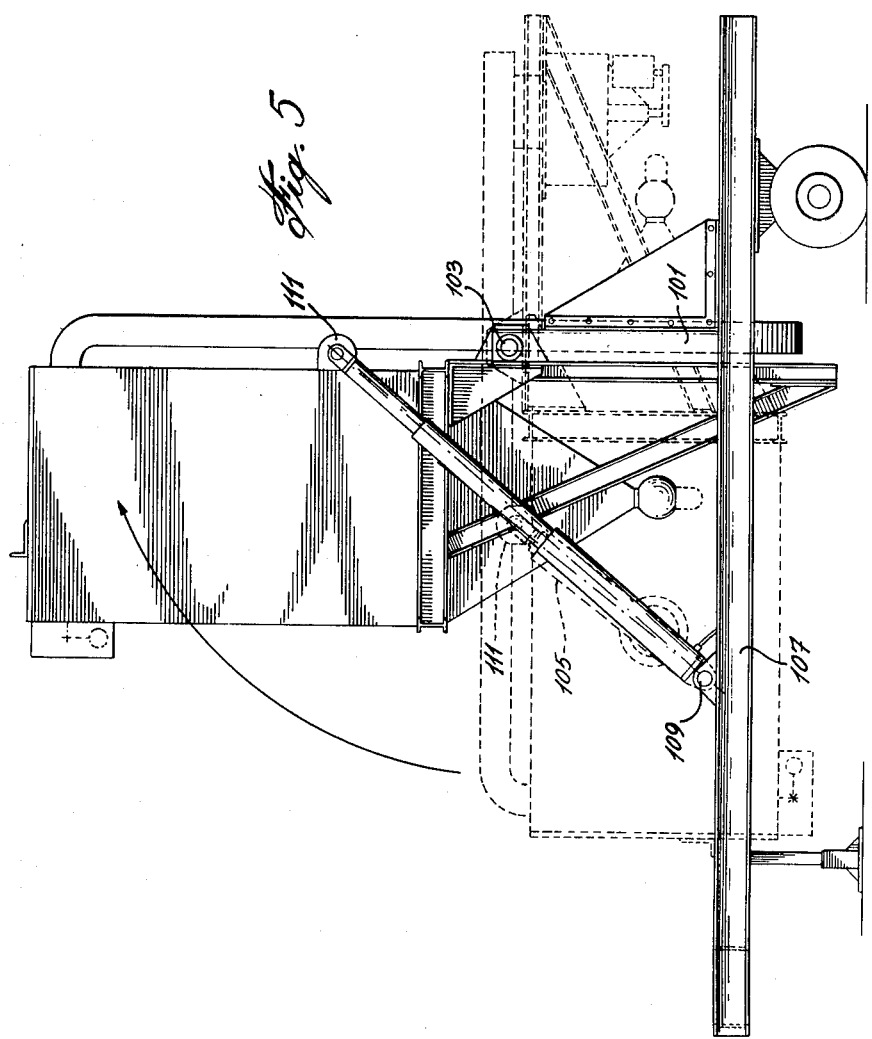
FIG. 5 illustrates an embodiment of the invention including means for swivelling the van into an upright position.

Referring now to the drawings, the dust collector comprises a housing structure, illustrated generally at 1, mounted on a trailer means 2. Having a front end 3 and back end 5. Disposed at the front end of the housing structure is a filter chamber 7 which is defined by a front wall 7F, a top wall 7T, a bottom wall 7B and two opposing side walls 7S (see FIG. 2). Disposed in filter chamber, and spaced rearwardly of the front wall 7F thereof, is a plate 9 which traverses the filter chamber. The plate 9 is shown in FIG. 3. As can be seen, the plate 9 comprises a plurality of openings 11.

Attached to each one of the openings, and extending rearwardly from the plate into the filter chamber, is a separate filter bag 13. The filter bags are made of a material which prohibits the passage of dust but which permits the passage of air therethrough. In a preferred embodiment, the filter bags are made of needle felt polyester.

Each of the filter bags is mounted on a wire frame (not shown) so that each bag is in an extended position and remains in this extended position throughout the operation of the dust collector. Located in one of the side walls of the filter chamber, between the front wall 7F and the plate 9, is an opening 15 which communicates outside air with the interior of the filter chamber. Disposed interiorly of the filter chamber, and extending rearwardly from the plate 9 and from the bottom wall to the top wall of the filter chamber is a baffle 17, which traverses the filter chamber along part of its length and is parallel with side wall 7B, the purpose of which will be discussed below.

A fan chamber 8 is disposed at the back end of the housing structure 1. The fan chamber may comprise a separate chamber or it may be defined by a top wall which constitutes a rearward extension of the top wall of the filter chamber, opposing side walls comprising rearward extensions of respective ones of the side walls of the filter chamber, and a bottom wall comprising a rearward extension of the bottom wall of the filter chamber.

Duct 19 extends between opening 21, and the top wall of the filter chamber, and opening 23, and the top wall of the fan chamber. The duct 19 preferably communicates with the opening 23 by means of further ducting 25 which also communicates with a fan means 27 disposed in the fan chamber. Thus, the fan means 27 communicates with the interior of the filter chamber 7 via the duct 19.

The filter chamber is terminated by wall means at the rear end thereof which, in the illustrated embodiment, comprises a truncated four sided pyramid and including walls 29, 31, 33 and 35. Disposed at the rearward tip of the pyramid is a rotatable valve 37 the function of which will be explained below.

Disposed at the back end of the trailer means are wheel means 39 which are adapted to rollingly support the trailer means when it is being moved from one position to another. Disposed at the front end of the trailer means are removable support means 41 which can be removed when the trailer means is connected, at the front end thereof, to a tractor, or the like, for transportation from one place to another.

In operation, the dust collector works as follows: when the dust collector is stored in a nonoperating position, it will be disposed as shown in FIG. 1, that is, resting on the wheel means 39 and the removable support means 41. To move the trailer means from one position to another, the front end 3 is attached to a tractor, or the like, by coupling means well known in the art. The removable support 41 is then removed and the tractor pulls the trailer means which is rollingly supported on the wheel means 39 during transport.

Preferably, the wheel means comprises a downward extension 40 which supports an axle 42. A separate wheel 43 is disposed on each side of the trailer means although a larger number of wheels may be used if required.

When the trailer means arrives at its operating site, it is turned onto its rear end by a crane to rest in a position as shown in FIG. 4. The trailer means and housing structure are held in the vertical position by angle supports 47 well known in the art.

With the housing structure in its vertical (operating) position, ducting is connected to the opening 15 and leading to the vibrating screen. The fan is then turned on and air is drawn into the fan in the path as described below:

Air from the ducting to the opening 15 is drawn in through the opening 15 and follows the arrow A shown in FIG. 2. The reason that the air moves rearwardly instead of forwardly is that the plate 9 and baffle 17 block any other path except the rearward path for air coming in through the opening 15. The air then moves along the path shown by the arrow B in FIG. 2 along the walls of the truncated pyramid, and is then forced forwardly along the direction given by the arrow C in FIG. 2. The air then passes through the filter bags where the dust is captured on the outside surface of the bags and only cleansed air passes through the bags and thence through the openings 11 in the plate 9. The air is then turned upwardly in the direction shown by the arrow D to the opening 21 and then rearwardly along the duct 19 in the direction shown by the arrow E. Finally, the air is pulled downwardly through ducting 25 into the fan 27 along the direction shown by the arrow F in FIG. 1. The cleansed air is then expelled by the fan back into the environment.

The valve 37 includes a rotating member 500 (see FIG. 1) which constantly rotates either in a clockwise or counter-clockwise direction as shown by the arrow H. With such an arrangement, dust is permitted to escape from the pyramid, however, air cannot flow back into the pyramid. To clean the bags, air under pressure is applied to air inlet 49 which communicates air with the interior of the filter chamber and forwardly of the plate 9. The air is thus blown through the bags 13 to blow the dust off the top surface of the filter bags. The dust is then expelled through the now open rotating valve 37.

With the dust collector disposed in the vertical condition, dust collected on the outside of the filter bags will have a tendency to fall off the bags towards valve 37 due to the force of gravity alone, so that the filters will not have to be cleansed as often. The position of the fan is selected to keep the fan out of the dirty air flow.

Although other shapes could be used for the wall separating the fan chamber from the filter chamber, the illustrated shape is preferred because it provides an even distribution, over the filter bags, of air being filtered, and it focuses the dust onto valve 37 when the bags are cleansed.

It can be seen that the dust collector illustrated provides a large filtering area because of the plurality of bags and the length of each bag. Thus, the collector can handle a large throughput of air to be cleansed, and the collector can operate for a lengthy period before it gets clogged and requires cleaning.

Thus, the dust collector illustrated and described is especially suitable for the heavy duty requirements at the vibrating screen of a quarry. Dust may also be collected on the inside part of the bags in which case the bag cleaning is accomplished by means of a shaker mechanism.

In the embodiment illustrated in FIGS. 1 to 4, a crane must be used to set the dust collector into an upright position. FIG. 5 illustrates an embodiment wherein the housing structure can be swivelled into an upright position by means of a mechanism carried on the trailer means and housing structure. Referring to FIG. 5, the housing structure, which is in all other respects the same as illustrated in FIGS. 1 to 4, includes in addition a vertically extending frame member 101. A separate one of such frame members is included on either side of the housing structure although only one is shown in the drawing. The housing structure is pivotally connected to the vertically extending frame member at 103.

A telescoping member 105 extends along the side of the housing structure. Again, there is a telescoping member on either side of the housing structure. The trailer means includes a horizontally extending frame member 107, and, again, there is such a horizontally extending frame member on either side of the trailer means.

The bottom end of the telescoping member is pivotally connected to the horizontally extending frame at 109, and the top end of the telescoping member is pivotally connected to the housing structure at 111. The connections for the telescoping member are the same on both sides of the housing structure and trailer means.

When the trailer means arrives at an operating site, the telescoping member is fully extended, as shown in solid lines, and the housing structure assumes the position shown in solid lines in FIG. 5. The dotted part of FIG. 5 illustrates the housing structure when it is either in its parking or moving position.

The telescoping member is preferably hydraulically operated.

Although the fan chamber and the fan have been illustrated in the drawings herein as being at rear of the filter chamber, it will of course be appreciated that the fan chamber and the fan can be disposed at the forward end of the filter chamber. In addition, it could be disposed above the filter chamber. In either of the cases, the fan will be connected by ducting to communicate with the interior of the filter chamber.

Although a specific embodiment has above been described, this was for the purpose of illustrating, but not limiting, the invention. Various modifications, which will come readily to the mind of one skilled in the art, are within the scope of the invention as defined in the appended claims.

I claim:
1. A mobile dust collector, comprising:
   trailer means having;
   a housing structure mounted on said trailer means, said housing structure including:
   (i) a filter chamber and a fan chamber;
   (ii) means communicating outside air with said filter chamber;
   (iii) filter means disposed in said filter chamber;
   (iv) fan means disposed in said fan chamber; and
   (v) means communicating the interior of said filter chamber with said fan means; and
   means for swivelling the housing structure from a substantially horizontal position to an upright position, said means comprising:
   a first telescoping member connected on one side of said housing structure;
   a second telescoping member connected on the other side of said housing structure;
   a first vertically extending frame member on one side of said housing structure;
   a second vertically extending frame member on the other side of said housing structure;
   a first horizontally extending frame member on one side of said trailer means;
   a second horizontally extending frame member on the other side of said trailer means;
   said housing structure being pivotally connected, at either side thereof, to said vertically extending frame members;
   the top of each telescoping member being connected to said housing structure at respective sides thereof; and
   the bottom of each telescoping member being connected to a respective one of said horizontally extending frame members; and
   wheel means at the back end of said trailer means to rollingly support said trailer means,

2. A dust collector as defined in claim 1 and further comprising separating wall means in said housing structure separating said filter chamber from said fan chamber.

3. A dust collector as defined in claim 2 wherein said separating wall means comprises a rearwardly extending truncated four sided pyramid.

4. A dust collector as defined in claim 2 wherein said filter chamber comprises a front end wall;
   plate means, spaced rearwardly from said front end wall and transversing said filter chamber;
   valve means disposed in said separating wall means; and
   wherein said means communicating comprises air inlet means disposed forwardly of said plate means in said filter chamber.

5. A dust collector as defined in claim 2 wherein said filter chamber comprises a front end wall;
   plate means, spaced rearwardly from said front end wall and transversing said filter chamber;
   said separating wall means comprising a rearwardly extending truncated four sided pyramid;
   valve means disposed at the rearward end of said pyramid; and
   wherein said means communicating comprises air inlet means disposed forwardly of said plate means in said filter chamber.

6. A dust collector as defined in claim 1 wherein said filter chamber is disposed at the front end of the housing structure and the fan chamber is disposed at the back end thereof.

7. A dust collector as defined in claim 3 wherein said filter chamber comprises a filter top wall and wherein said fan chamber comprises a fan top wall;
   a first top opening in said filter top wall and a second top opening in said fan top wall;
   wherein, said means communicating the interior of said filter chamber with said fan means comprises duct means connected, at one end thereof, to said first opening and, at the other end thereof, to said second opening.

8. A dust collector as defined in claim 1 wherein said filter chamber comprises opposing side walls;
   said means communicating outside air with said filter chamber comprising an opening in one of said side walls.

9. A dust collector as defined in claim 1 wherein said filter chamber comprises a front end wall;
   plate means, spaced rearwardly from said front end wall and transversing said filter chamber, said plate means comprising a plurality of openings;
   wherein, said filter means comprises a separate filter bag connected to each one of said openings, each filter bag extending from said plate means and rearwardly into said filter chamber.

10. A dust collector as defined in claim 9 wherein said filter chamber further comprises opposing side walls;

said means communicating outside air with said filter chamber comprising an opening in one of said side walls;
said opening being disposed between said front end wall and said plate means.

11. A dust collector as defined in claim 1 and further comprising removable support means disposed at the forward end of said trailer means.

12. A dust collector as defined in claim 1 wherein said filter chamber comprises opposing side walls;
said means communicating outside air with said filter chamber comprising an opening in one of said side walls.

13. A mobile dust collector, comprising:
trailer means;
a housing structure mounted on said trailer means, said housing structure including:
a filter chamber at the front end thereof, said filter chamber defined by a front end wall, two opposing side walls, a top wall and a bottom wall;
plate means transversing said filter chamber and spaced rearwardly from said front end wall, said plate means comprising a plurality of openings;
a separate filter bag at each of said openings, each of said filter bags extending from said plate means and rearwardly into said filter chamber;
a side opening in one of said side walls of said filter chamber between said first end wall and said plate means;
a first top opening in said top wall of said filter chamber;
a fan chamber at the back end thereof and having a fan means disposed in said fan chamber, said fan chamber being defined by at least a fan chamber top wall;
a second top opening in said fan chamber top wall;
duct means connected, at one end thereof, to said first top opening and, at the other end thereof, to said second top opening, whereby said fan means is in communication with the interior of said filter chamber; and
means for swivelling the housing structure from a substantially horizontal position to an upright position, said means comprising:
a first telescoping member connected on one side of said housing structure;
a second telescoping member connected on the other side of said housing structure;
a first vertically extending frame member on one side of said housing structure;
a second vertically extending frame member on the other side of said housing structure;
a first horizontally extending frame member on one side of said trailer means;
a second horizontally extending frame member on the other side of said trailer means;
said housing structure being pivotally connected, at either side thereof, to said vertically extending frame members;
the top of each telescoping member being connected to said housing structure at respective sides thereof; and
the bottom of each telescoping member being connected to a respective one of said horizontally extending frame members; and
wheel means at the back end of said trailer means to rollingly support said trailer means.

14. A dust collector as defined in claim 13 wherein said top wall of said fan chamber comprises a rearward extension of said top wall of said filter chamber.

15. A dust collector as defined in claim 13 wherein said fan chamber comprises opposing side walls and a bottom wall;
said opposing side walls of said fan chamber comprising rearward extensions of respective ones of said side walls of said filter chamber;
said bottom wall of said fan chamber comprising a rearward extension of said bottom wall of said filter chamber; and
said top wall of said fan chamber comprising a rearward extension of said top wall of said filter chamber.

16. A dust collector as defined in claim 15 and further comprising separating wall means in said housing structure separating said filter chamber from said fan chamber.

17. A dust collector as defined in claim 16 wherein said separating wall means comprises a rearwardly extending truncated four sided pyramid.

18. A dust collector as defined in claim 17 further including
valve means disposed at the rearward end of said pyramid.

19. A dust collector as defined in claim 18 and further comprising removable support means disposed at the forward end of said trailer means.

20. A dust collector as defined in claim 13 and further comprising:
baffle means extending rearwardly from said plate means and transversing said filter chamber along part of the length thereof;
said baffle means extending parallel with said side walls.

* * * * *